March 16, 1943.  S. G. WOOD  2,313,793
WIRE STRIPPING TOOL
Filed Feb. 16, 1940
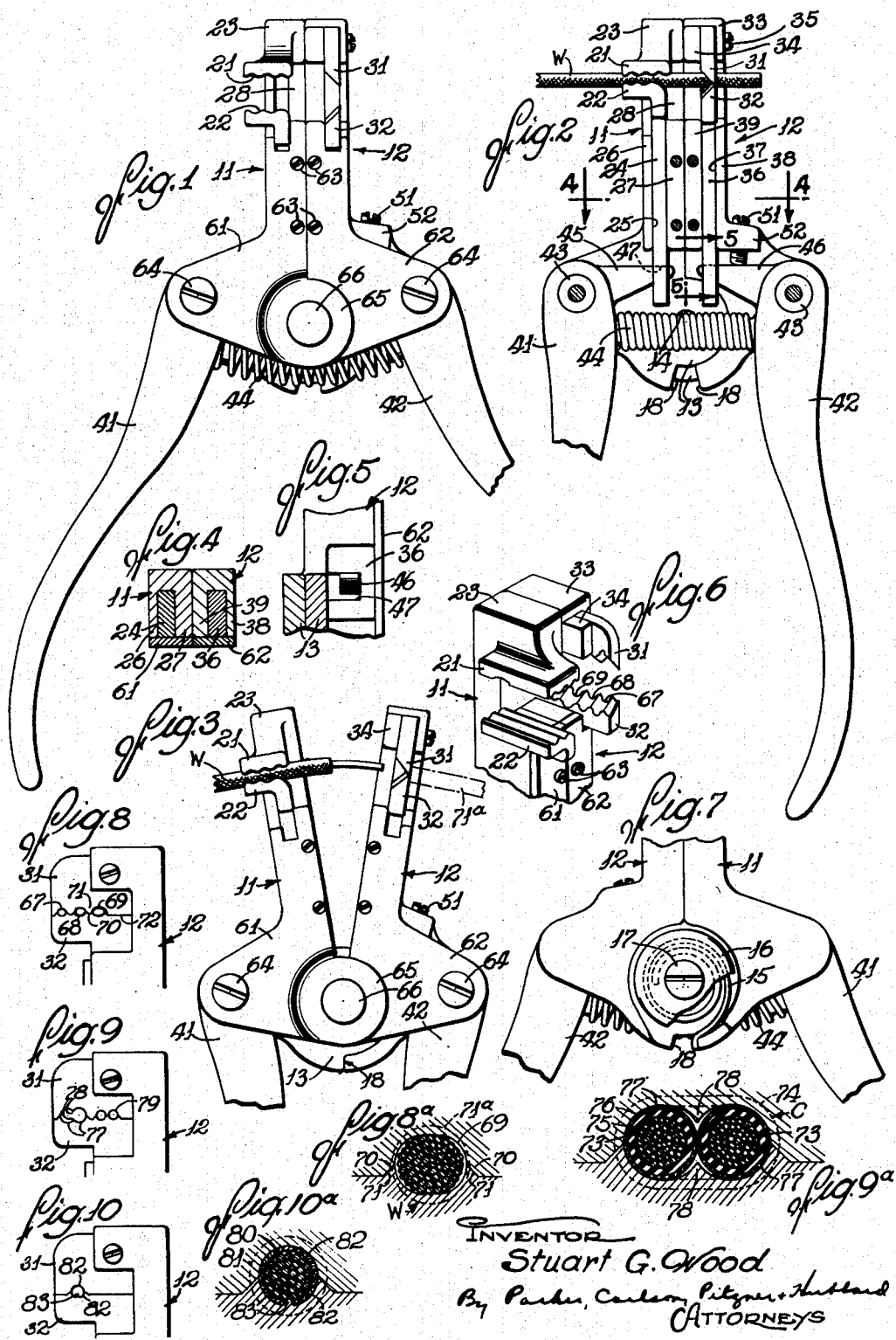
INVENTOR
Stuart G. Wood
By Parker, Carlson, Pitzner + Hubbard
ATTORNEYS Patented Mar. 16, 1943

2,313,793

UNITED STATES PATENT OFFICE 2,313,793

WIRE STRIPPING TOOL

Stuart G. Wood, Rockford, Ill.

Application February 16, 1940, Serial No. 319,272

7 Claims. (Cl. 81—9.5)

The invention relates to hand tools of the plier type and more particularly to an improved tool for stripping the insulation from insulated wire or cable.

One object is to provide a simplified and very durable tool of the above general character having insulation stripping blades which are readily interchangeable to adapt the tool for stripping individual wires as well as duplex cables of a wide variety of types and sizes.

Another object is to provide novel means for retaining the insulation stripping blades in place and for strengthening the blade carrying jaws against the twisting strains.

Another object is to provide improved means for adjusting the tool to compensate for wear of the stripping blades.

Still another object is to provide improved stripping blades for wire stripping tools of the above type which, for reason of their novel form, insure clean and accurate severance of the insulation without damage to the wire enclosed thereby.

Other objects and advantages of the invention will become apparent from the following detailed description of the preferred embodiment illustrated in the accompanying drawing in which:

Figure 1 is a top view of a wire stripping tool embodying the features of the invention.

Fig. 2 is a top view of the tool showing the positions of the parts in the first stage of operation.

Fig. 3 is a top view of the tool showing the positions of the parts in the final stage of operation.

Fig. 4 is a transverse sectional view taken along the lines 4—4 of Fig. 2.

Fig. 5 is a view taken along the line 5—5 of Fig. 2 showing details of one of the stripping blades.

Fig. 6 is a fragmentary perspective view of the wire clamping means and the stripping blades.

Fig. 7 is a fragmentary view of the under side of the tool showing details of the jaws and the means for closing them together.

Fig. 8 is a side view of a stripping blade assembly for stripping insulated wires of various sizes.

Fig. 8a is a sectional view of a stranded wire engaged between the stripping blade shown in Fig. 8.

Fig. 9 is a side view of a modified stripping blade assembly particularly suitable for removing the sheath from duplex cables and for stripping the individual wires of such cables.

Fig. 9a is a sectional view of a duplex cable engaged between the sheath removing portion of the blade assembly shown in Fig. 9.

Fig. 10 is a side view of another form of stripping blade assembly particularly adapted for stripping double-insulated wire.

Fig. 10a is a sectional view of an insulated wire engaged between the stripping blades shown in Fig. 10.

While the invention may be embodied in various forms, it is shown herein for purposes of illustration as a hand tool of the plier type having wire clamping means and wire stripping means arranged to act on a wire or cable at different points along its length together with actuating means operative first to cause the clamping means to grip the wire and the stripping means to cut into the insulation thereon as far as possible without damaging the wire and then to cause a relative movement between the clamping means and stripping means effective to complete the parting or breaking of the insulation and to strip it from the wire.

Referring now to Figs. 1 and 2 of the drawing, the improved wire stripping tool in its preferred form comprises a pair of generally L-shaped jaw members 11 and 12 arranged with their longer legs in side-by-side relation and pivoted together substantially on the center line of the tool. As herein shown, the jaw members are formed with interfitting hinge lugs 13 secured together by a pivot pin 14. A coiled torsion spring 15 (Fig. 7), disposed coaxially to the pivot pin 14 and anchored at its opposite ends to the respective jaws, tends to close the jaws together. The spring is desirably enclosed by a shallow cup-shaped cover 16 removably secured in place as by a screw 17, the cover serving to guard the spring and retain it in place and to improve the appearance of the tool. Angularly disposed shoulders 18 formed on the lower edges of the respective jaws adjacent the hinge lugs coact to limit the opening movement of the jaws to the position shown in Fig. 3.

In the particular tool illustrated, the jaw 11 carries the wire clamping means herein shown as comprising a stationary clamping shoe 21 and a movable clamping shoe 22. The shoe 21 in this instance is formed on an upstanding lug 23 integral with the outer or free end of the jaw. The movable clamping shoe 22 is preferably formed on one end of an elongated bar 24 slidably supported in a groove 25 defined by spaced flanges 26 and 27 extending upwardly from the face of the jaw at the adjacent side edges thereof. The groove extends substantially parallel to the center line of the tool when the jaws are closed together as shown in Fig. 2 and the slide bar 24 with its clamping shoe 22 is thus movable toward and from the stationary clamping jaw 21. As will be seen by reference to Fig. 2, the flanges terminate a substantial distance below the stationary clamping jaw leaving a transverse opening 28 in which a wire W to be stripped may be placed when the clamping shoes are in their normal open position as shown in Fig. 1.

The wire stripping means is carried on the jaw 12 in substantial alinement with the clamping means. As herein shown the stripping means includes a stationary stripping blade 31 and a movable stripping blade 32. These blades may take various forms in accordance with the particular type of wire or cable operated on as will be explained hereinafter. To provide for convenient interchange of stripping blades, the stationary blade 31 is preferably removably secured in a recess formed in an upstanding lug 33 at the outer or free end of the jaw 12. Additional support for the outer end of the blade is provided by a backing member 34 herein shown as an extension of the lug 33 at one side of the blade receiving recess. A set screw 35 may be utilized to lock the blade in the recess in well known manner.

The movable blade 32 in this instance is formed on one end of an elongated bar 36 slidably received in a groove 37 defined by upstanding flanges 38 and 39 on the upper face of the jaw. These latter flanges terminate substantially in line with the flanges 26 and 27 thus continuing the transverse opening 28 entirely across the jaws of the tool.

Actuation of the clamping means and stripping means is effected by suitable manually operable means including a pair of handles in the form of hand levers 41 and 42 shaped for convenient gripping in the hand. As herein shown, the levers are pivoted respectively on cylindrical studs 43 formed on the short legs of the jaws 11 and 12. A coiled compression spring 44 interposed between the levers urges them to the open position shown in Fig. 1.

For actuating the wire clamping means the lever 41 is provided adjacent its pivoted end with a rigid, inwardly projecting arm 45 (Fig. 2) engageable in a notch in the inner end of the slide bar 24. The lever 42 is similarly arranged for actuating the movable stripping blade 32 having for this purpose a rigid arm 46 engageable in a notch in the slide bar 36. This arrangement is clearly indicated in Fig. 5 wherein the notch is designated by the reference character 47. It will be observed that the notch is open at one side so that the bar may be readily disengaged from the actuating arm by simply lifting it out of its groove. This materially facilitates interchange of stripping blades.

With the above arrangement, the levers 41 and 42 act when pressed together, to impart endwise movement to slides 24 and 36 and thus shift the movable clamping shoe 22 and the movable stripping blade 32 toward the stationary clamping shoe 21 and the stationary blade 31, respectively. Such movements of the shoe and blade continue until the insulation of the wire W is gripped between the shoes 21 and 22 and the clamping blades are closed together to partially sever the insulation (see Fig. 8a). This may be conveniently called the first stage of the operation of the tool.

Upon further movement of the levers 41 and 42 in the second stage of the operation, the jaws 11 and 12 are spread apart, that is, they are swung about their common pivot to the position shown in Fig. 3. As the wire W is securely gripped by the clamping shoes, it necessarily moves with the jaw 11 while the insulation at the end of the wire, having been partially severed by the stripping blades, is torn free from the insulation on the remaining portion of the wire and pushed off as shown in this figure.

In order to prevent the blades from meeting with too great pressure and thereby damaging the cutting edges or causing overlapping which would permit them to pass entirely through the insulation and cut the wire, it is desirable to limit the range of movement of the blade 32. This limiting means is an important feature of the present invention and is desirably made adjustable so as to permit compensation for the wear of the blades. As herein shown, the limiting means comprises a stop screw 51 threaded into an upstanding shoulder 52 on the jaw 12. The inner end of the stop screw is positioned to engage the arm 46 at the desired point and thus effectively limit the closing movement of the blade 32. This, by properly setting the screw, the meeting point of the stripping blades can be accurately determined to insure proper positioning at all times. The stop screw 51 also serves as a convenient means for varying the initial operating stroke of the hand lever 42 to accommodate different types of stripping blade assemblies as well as blades whose effective width has been reduced as by repeated sharpening.

To facilitate replacement of the blades when worn and to reinforce the jaw structure, novel means is provided for retaining the movable clamping shoe and the movable stripping blade in place. This means, as herein shown, comprises a cover plate constructed in separable sections 61 and 62 shaped to conform generally to the contour of the jaws 11 and 12 respectively. The cover sections are thus adapted to fit over the grooves 25 and 37 to form closed guideways for the bars slidable therein and additionally extend over the hand lever pivot studs 43 so as to hold the levers in place. The cover plates are removably secured to the jaws by any suitable means such as screws 63 threading into tapped holes in the flanges 27 and 39 and screws 64 threading into tapped holes in the pivot studs 43 of the respective jaws.

As stated hereinbefore, the stripping blade assembly may be made in a variety of forms for operating on wires and cables of different types and sizes. Thus, for stripping individual single insulated wires, the adjacent edges of the blades 31 and 32 may conveniently take the form shown in Fig. 8. Three relatively deep generally arcuate notches 67, 68 and 69 register when the blades are closed together to define apertures having a slightly oval contour. The notches are so dimensioned that the shorter diameter of each aperture is approximately the same as the diameter of the wire with which the aperture is intended to be used. The edges of the notches, which are sharpened by beveling, on the side adjacent the work clamping shoes as shown in Fig. 6, are effective to partially sever the insulation on opposite sides of the wire. The three apertures shown will accommodate a larger number of wire sizes. The best rule to follow in selecting the aperture for a given wire is to use the largest one which will sever the insulation satisfactorily without requiring undue pressure on the handles.

Additional shallower notches 70 and projections 71 are formed in the edges of the blades on each side of the notches 67, 68 and 69. These projections serve not only to facilitate guiding of the wires into the notches 67, 68 and 69 but also to interengage in the closed position of the jaws and bring the notches into proper register.

The inclination of the meeting edges above referred to, together with the general oval contour of the registering notches, is advantageous in enabling the blades to strip insulation cleanly from the wire without damaging the wire itself. Thus, when the blades are closed together on a stranded wire such as that shown in Fig. 8a, the cutting edges of the notches 69, or whatever notches are in use, pass substantially through the insulation 71a on the upper and lower sides of the wire. The oval contour of the aperture permits a slight flattening of the group of strands when necessary so that none of the individual strands forced between the blades, as would be the case with circular apertures, are damaged by the cutting edges of the notches. Due to the interlocking of the projections 71 in the notches 70, any tendency of the strands to enter between the meeting edges of the blades is effectually prevented.

In addition to the insulation stripping portions above described, the blade assembly shown in Fig. 8, as well as the other blade assemblies to be described hereinafter, may be formed with a wire cutting portion 72. For this purpose, corresponding sections of each blade are formed with straight cutting edges adapted to meet when the blades are closed together. These cutting edges may be sharpened in the same manner as the stripping portions of the blade above described. Thus, when it is desired to cut a wire, it is inserted between the blades 31 and 32 in register with the cutting edges 72 and when the blades are closed together, both the wire and insulation are cut off cleanly.

The stipping blade assembly shown in Fig. 9 is particularly suitable for operating on sheathed duplex cable C such as that shown in Fig. 9a. The particular cable illustrated comprises a pair of stranded wires 73 laid side by side and enclosed in a common sheath 74, usually of braided cotton, silk or other suitable thread. Each wire is individually insulated by two layers of insulating material, namely, an inner layer 75 of rubber or the like, and an outer layer 76 usually of cotton thread.

Referring now to Fig. 9, the stripping blades 31 and 32 in this instance are formed with one stripping portion especially designed for removing the sheath 74 from the cable, and a second stripping portion for removing the insulation from the individual wire 73 simultaneously. For the sheath removing operation the blades are formed with elongated notches 77 defining generally arcuate cutting edges adapted to sever the sheath 74 on opposite side edges of the cable when the blades are closed together. Substantially centrally of each notch is formed an inwardly projecting prong 78 having a pointed tip adapted to penetrate the uncut portion of the sheath between the wire 73. The prongs thus serve to grip the sheath and when the jaws are spread apart they act to tear the end portion free from the portion adjacent the clamping means. A clean break of the sheath is thus insured.

The insulation stripping portion of the blade assembly of Fig. 9 comprises two pair of relatively deep registering notches 79 dimensioned to partially cut the insulating layers 75 and 76 of the individual wires 73. These notches are arranged relatively close together so that both wires may be stripped simultaneously in a single operation of the tool, this operation being performed after the sheath is removed as above explained. Interfitting shallow notches and projections such as those described above in connection with the blade assembly of Fig. 8 prevent damage to the individual strands of the wires.

The modified stripping blade assembly shown in Fig. 10 is intended particularly for stripping stranded double insulated wire such as that shown in Fig. 10a in which the inner layer 80 of insulation consists of a wrapped or braided serving of cotton, silk or other suitable thread material. The outer layer 81 of insulation which is superimposed upon the inner layer may be either a molded rubber coating or a braided thread. Due to the thinness of the inner layer 80 of insulation, it is impractical to sever it completely in the usual manner without danger of cutting some of the wire strands. The stripping blades are, therefore, formed with registering notches 82 dimensioned to cut through only the outer insulating layer or perhaps partially through the layer 80. One or both of these notches may be formed with an inwardly projecting prong 83 adapted to pierce the inner insulating layer 80 and enter between the strands of the wire. The prong or prongs thus grip the insulating layer 80 and, when the jaws of the tool are spread apart, push the end portions of the insulation along the wire until it is torn from the insulation on the main body of the wire. The cutting edges of the notches having severed the outer layer of insulation, the blades are effective in their movement to push the same along the wire in the usual manner. The friction between the two layers of insulation materially assists the tearing of the inner layer. In this way the double insulated wire may be stripped clean in a single operation of the tool.

It will be apparent from the foregoing that the invention provides a wire stripping tool of novel and advantageous construction. The tool is simple and durable and is readily adaptable for operating on a wide variety of individual wires and duplex cables of different types and sizes. Due to the novel means provided for retaining the wearing parts of the tool in place, interchange of stripping blades is greatly facilitated. Moreover the blades may be quickly and easily adjusted to compensate for wear or to adapt the tool for use with different blades assemblies. The invention also provides an improved stripping blade assembly of novel form adapted to insure clean and accurate severance of the insulation without damage to the wire enclosed thereby.

I claim as my invention:

1. A tool for stripping insulated wire comprising, in combination, a pair of elongated jaws arranged in side-by-side relation and pivoted together adjacent one end, wire clamping means on one jaw including a stationary shoe, a bar slidably disposed in a groove extending longitudinally of the jaw and having at one end a shoe adapted to cooperate with said stationary shoe, wire stripping means on the other jaw including a stationary blade, a bar slidably disposed in a groove extending longitudinally of the other jaw and having at one end a blade adapted to cooperate with said stationary blade, a pair of hand levers pivoted respectively on said jaws, means connecting said hand levers and said bars operating when the levers are pressed together to first advance said bars and then to swing the jaws apart, and means for retaining said bars in their respective grooves comprising a cover plate constructed in two sections, each secured to one of the jaws in a position to cover the groove therein, said cover sections being connected together for pivotal movement on an axis coincident with the pivotal axis of the jaws.

2. A tool for stripping insulated wire comprising, in combination, a pair of elongated jaws arranged in side-by-side relation and pivoted together adjacent one end, wire clamping means including cooperating fixed and movable shoes carried on one of said jaws, wire stripping means including cooperating fixed and movable blades carried on the other of said jaws, means on said jaws providing ways guiding said movable shoe and movable jaw for rectilinear movement, hand levers pivotally mounted on the respective jaws to turn on axes which are fixed relative to the jaws and having bearing engagement with the movable shoe and blade, said levers being operable, when rocked about their respective pivots, to close the clamping jaws and stripping blades together and then to spread the jaws apart, and means for retaining the movable shoe, the movable blade and the levers in place while permitting convenient access thereto for removal or replacement, said retaining means comprising cover plates constructed removably secured to the respective jaws for movement therewith and interconnected to pivot on the same axis as said jaws.

3. A tool for stripping insulated wire comprising, in combination, a pair of elongated jaws arranged in side-by-side relation and pivoted together adjacent one end, spaced ribs upstanding from each of said jaws and defining between them a longitudinally extending channel, spring means yieldably urging said jaws together, wire clamping and stripping members slidable endwise in the channels of the respective jaws, a hand lever pivotally supported on each jaw to turn on an axis which is fixed relative to the jaw and connected to the member thereon to actuate the same, and plates detachably fastened to said ribs and covering said channels.

4. A tool for stripping insulated wire comprising, in combination, a pair of elongated jaws arranged in side-by-side relation and pivoted together adjacent one end, one of said jaws having a clamping element thereon and the other jaw having a stripping element thereon, means on each of said jaws defining a longitudinally extending channel, spring means yieldably urging said jaws together, wire clamping and stripping members slidable endwise in the channels of the respective jaws and cooperating respectively with said clamping and stripping elements, plates fastened to said jaws and covering said channels and pivots fixedly supported at opposite ends by said jaws and said plates, and hand levers mounted on said pivots and having arms engaging the respective members to shift the latter endwise with respect to said elements.

5. A tool for stripping insulated wire comprising, in combination, a pair of elongated jaws arranged in side-by-side relation and pivoted together adjacent one end, means on each of said jaws defining a longitudinally extending channel, spring means yieldably urging said jaws together, wire clamping and stripping members slidable endwise in the channels of the respective jaws, a hand lever pivotally supported on each jaw to turn on an axis which is fixed relative to the jaw and connected to the member thereon to actuate the same, and plates fastened to said jaws to cover said channels and pivotally connected together to turn on an axis coincident with that of said jaws.

6. A tool for stripping insulated wire comprising, in combination, a pair of elongated jaws arranged in side-by-side relation and pivoted together adjacent one end, spaced ribs upstanding from each of said jaws and defining between them a longitudinally extending channel, spring means yieldably urging said jaws together, wire clamping and stripping members slidable endwise in the channels of the respective jaws, and a hand lever pivotally supported on each jaw to turn on an axis which is fixed relative to the jaw and having a bearing connection with the movable member thereon whereby the member is slidable bodily along its guiding channel by pivoting of the lever.

7. A tool for stripping insulated wire comprising, in combination, a pair of elongated jaws arranged in side-by-side relation and pivoted together adjacent one end, channels on said jaws extending longitudinally thereof, spring means yieldably urging said jaws together, wire clamping and stripping members rectilinearly slidable in the respective channels, and bellcrank levers mounted on the respective jaws to turn about axes fixed relative to the jaw and spaced outwardly from said members, each lever comprising an elongated arm projecting generally longitudinally of the jaws and a short transverse arm connected to one of said members and operable to reciprocate the latter as said long arm is swung back and forth transversely of the direction of such reciprocation.

STUART G. WOOD.